(12) United States Patent
Tsuji

(10) Patent No.: US 9,032,822 B2
(45) Date of Patent: May 19, 2015

(54) POWER TRANSMISSION DEVICE OF TRACTOR

(75) Inventor: Kenichiro Tsuji, Ashiya (JP)

(73) Assignee: Kubota Corporation, Osaka (JP)

( * ) Notice: Subject to any disclaimer, the term of this patent is extended or adjusted under 35 U.S.C. 154(b) by 106 days.

(21) Appl. No.: 13/825,742

(22) PCT Filed: Sep. 27, 2011

(86) PCT No.: PCT/JP2011/072076
§ 371 (c)(1),
(2), (4) Date: May 1, 2013

(87) PCT Pub. No.: WO2012/043561
PCT Pub. Date: Apr. 5, 2012

(65) Prior Publication Data
US 2013/0213158 A1 Aug. 22, 2013

(30) Foreign Application Priority Data

Sep. 28, 2010 (JP) ................. 2010-217482
Sep. 28, 2010 (JP) ................. 2010-217483
Sep. 28, 2010 (JP) ................. 2010-217484

(51) Int. Cl.
*B60K 17/28* (2006.01)
*F16H 37/06* (2006.01)
(Continued)

(52) U.S. Cl.
CPC ........ *F16H 37/065* (2013.01); *B60W 2300/152* (2013.01); *F16H 2037/049* (2013.01);
(Continued)

(58) Field of Classification Search
CPC ........ B60K 17/28; B60K 25/06; B60K 25/00; B60K 17/08; B60K 25/08; B60K 17/30; B60K 17/043; B60K 37/043; F16H 37/00; F16H 37/043; F16H 3/001; F16H 3/14; F16H 3/18; F16H 3/093; F16H 57/02; F16H 61/32; F16H 61/30; F16H 61/12
USPC .................. 74/15.2, 15.4, 15.6, 15.63, 15.66, 74/15.84, 15.86, 665 G, 665 GB, 606 R, 74/606 A, 329, 330, 331, 335; 180/53.1, 180/53.2, 53.6, 53.61, 53.62, 53.7
See application file for complete search history.

(56) References Cited

U.S. PATENT DOCUMENTS 4,484,488 A * 11/1984 Kato et al. ...................... 74/361
4,716,775 A * 1/1988 Horii et al. ................... 74/15.86
(Continued)

FOREIGN PATENT DOCUMENTS

JP 5280615 A 10/1993
JP 828650 A 2/1996
(Continued)

*Primary Examiner* — Ha D Ho
*Assistant Examiner* — Jude Agendia
(74) *Attorney, Agent, or Firm* — The Webb Law Firm

(57) ABSTRACT

The arrangement of driven gears on a countershaft in a main speed change mechanism is shortened in an axial direction, whereby the main speed change mechanism can be made compact in the axial direction. Driven gears on a countershaft of a main speed change mechanism are successively arranged from front to rear in descending order of speed. A sub-low-speed drive gear for a sub-speed change mechanism is provided in front of the highest-speed driven gear on the countershaft, and the next-highest-speed driven gear serves as a sub-high-speed drive gear for the sub-speed change mechanism. A sub-low-speed driven gear and a sub-high-speed driven gear for the sub-speed change mechanism are provided on an output shaft to be engaged with the sub-low-speed drive gear and the next-highest-speed driven gear, respectively, and the highest-speed driven gear, the sub-low-speed drive gear, and the next-highest-speed driven gear are caused to overlap in a fore-and-aft direction.

12 Claims, 5 Drawing Sheets

(51) Int. Cl.
*F16H 57/021* (2012.01)
*F16H 37/04* (2006.01)
*F16H 57/02* (2012.01)

(52) U.S. Cl.
CPC ...... *F16H2200/0004* (2013.01); *F16H 37/043* (2013.01); *F16H 2057/02056* (2013.01); *F16H 57/021* (2013.01); *F16H 2057/0216* (2013.01)

(56) References Cited

U.S. PATENT DOCUMENTS

| | | | | |
|---|---|---|---|---|
| 5,339,703 | A * | 8/1994 | Tanaka | 74/15.4 |
| 6,003,391 | A * | 12/1999 | Kojima et al. | 74/15.66 |
| 6,786,317 | B2 * | 9/2004 | Matsufuji et al. | 192/48.611 |
| 7,434,488 | B2 * | 10/2008 | Tsuji et al. | 74/343 |
| 8,181,547 | B2 * | 5/2012 | Tsuji et al. | 74/335 |
| 8,657,713 | B2 * | 2/2014 | Hana et al. | 475/72 |
| 2002/0042852 | A1 * | 4/2002 | Umemoto et al. | 710/1 |
| 2003/0042104 | A1 | 3/2003 | Matsufuji et al. | |
| 2006/0243513 | A1 | 11/2006 | Tsuji | |
| 2007/0123386 | A1 * | 5/2007 | Hasegawa | 477/115 |
| 2009/0100952 | A1 | 4/2009 | Tsuji et al. | |

FOREIGN PATENT DOCUMENTS

| | | |
|---|---|---|
| JP | 9112637 A | 5/1997 |
| JP | 200374648 A | 3/2003 |
| JP | 200696108 A | 4/2006 |
| JP | 2006307955 A | 11/2006 |
| JP | 2007145217 A | 6/2007 |
| JP | 200996375 A | 5/2009 |
| JP | 2009162266 A | 7/2009 |

\* cited by examiner

POWER TRANSMISSION DEVICE OF TRACTOR

TECHNICAL FIELD

The present invention relates to power transmission devices for tractors.

BACKGROUND ART

In conventional power transmission devices for tractors, as shown in Patent Document 1, a main speed change mechanism that can switch between multiple speeds is provided between an input shaft to which forward and reverse drive power is transmitted from a forward/reverse drive switch mechanism, and a countershaft, and a sub-speed change mechanism that can switch between two speeds (a high and a low speed) is provided between the countershaft and an output shaft that transmits rear-wheel drive power. The driven gears on the countershaft of the main speed change mechanism are successively provided from front to rear in descending order of speed (the foremost driven gear is the highest-speed gear, and the rearmost driven gear is the lowest-speed gear). A sub-low-speed drive gear for the sub-speed change mechanism is provided between the second-speed and third-speed driven gears on the countershaft. The third-speed driven gear (next-highest-speed driven gear) is used as a sub-high-speed drive gear for the sub-speed change mechanism.

Clutch means is required in order for any one of a sub-low-speed driven gear and a sub-high-speed driven gear on the output shaft that are engaged with the sub-low-speed drive gear and the sub-high-speed drive gear (next-highest-speed driven gear), respectively, for the sub-speed change mechanism, to be selectively connected to the output shaft. The two driven gears need to be spaced from each other by an interval in an axial direction that is large enough to take the clutch means.

Patent Document 1 also describes the following. Specifically, a first and a second supporting wall are provided in a mission case linked to a flywheel housing to form a first chamber that is in communication with an interior of the flywheel housing, a second or middle chamber, and a third or rear chamber. The second and third chambers serve as an oil bath. A plurality of speed change mechanisms in a travel system that convert power of a propeller shaft into different speeds are provided in the second chamber. A front-wheel drive power extracting shaft that extracts power from the speed change mechanisms via front-wheel drive power extracting means in order to drive the front wheels, is supported by the second supporting wall that separates a rear portion of the second chamber.

In Patent Document 2, a first and a second supporting wall are provided in the front one of a front and a rear mission case. A hydraulic switch type forward/reverse drive switch mechanism that converts power of a propeller shaft into a forward speed and a reverse speed is provided in a second chamber. A main speed change mechanism that converts the power from the forward/reverse drive switch mechanism into multiple speeds, a sub-speed change mechanism that converts the power converted by the main speed change mechanism into a high and a low speed, and an output shaft that transmits rear-wheel drive power from the sub-speed change mechanism, are provided in a third chamber. A front-wheel drive power extracting shaft that extracts and transmits the power of the output shaft as front-wheel drive power via front-wheel drive power extracting means, is supported by the first and second supporting walls.

Patent Document 1 also describes the following. Specifically, a first and a second supporting wall are provided in a front mission case provided between a flywheel housing and a rear mission case to form a first chamber that is in communication with an interior of a flywheel housing, a second or middle chamber, and a third or rear chamber. A first speed change mechanism of a travel system that transmits power of a propeller shaft to the second chamber is provided in the second chamber. A second speed change mechanism that transmits power from the first speed change mechanism is provided in the third chamber. A PTO drive shaft is coaxially and directly linked to a rear portion of the propeller shaft. A PTO power transmission shaft is linked via a PTO clutch to a rear portion of the PTO drive shaft. A rear-axle supporting holder that forms a back wall of the third chamber is removably mounted to the front mission case. The rear-axle supporting holder supports a shaft of the second speed change mechanism. The PTO drive shaft penetrates the rear-axle supporting holder. Pump drive power extracting means that transmits power of the PTO drive shaft to a hydraulic pump mounted on an outer surface of the rear mission case is provided between the rear-axle supporting holder and the PTO clutch.

The pump drive power extracting means has a power transmission bevel gear mounted to the PTO drive shaft, and an extraction bevel pinion that is engaged with the power transmission bevel gear and is removably linked to a pump shaft of the hydraulic pump.

CITATION LIST

Patent Document

Patent Document 1: JP 2006-307955 A
Patent Document 2: JP 2006-96108 A

SUMMARY OF INVENTION

Technical Problem

In the conventional technique described in Patent Document 1, the sub-low-speed drive gear and the sub-high-speed drive gear (next-highest-speed driven gear) need to be separated from each other by an interval that is large enough to take the clutch means. Therefore, no gear can be provided between the sub-low-speed drive gear and the sub-high-speed drive gear, leading to an increase in the length in the axial direction of the main speed change mechanism. As a result, it is difficult to provide a compact main speed change mechanism.

It is an object of the present invention to provide a power transmission device for a tractor that can solve such a problem with the conventional technique.

In the conventional techniques described in Patent Documents 1 and 2, the front and rear portions of the mission case are in fluid communication with each other to form an oil bath. An oil path that allows the second and third chambers to be in communication with each other is formed in the second supporting wall. The second supporting wall supports not only the main speed change mechanism, the sub-speed change mechanism, and the output shaft at an upper, a middle, and a lower portion thereof, but also the front-wheel drive power extracting shaft at a lower portion thereof. Therefore, a bearing and a power transmission gear on the front-wheel drive power extracting shaft impede the flow of oil from the second chamber to the third chamber, leading to an increase in oil temperature. In particular, when the speed change mechanism is of the hydraulic switch type, a large amount of oil flows out of the speed change mechanism, and therefore, there is a problem with the flowability of the oil.

It is an object of the present invention to provide a power transmission device for a tractor that can solve such a problem with the conventional technique.

In the conventional pump drive power extracting means described in Patent Document 1, the power transmission bevel gear is supported on the back side of the rear-axle supporting holder, while the extraction bevel pinion is supported by a pump holder that is formed separately from the rear-axle supporting holder. The pump holder is externally inserted into and is mounted to the rear mission case. Therefore, it is difficult to accurately engage the power transmission bevel gear with the extraction bevel pinion, and, for example, the pump holder is required in addition to the rear-axle supporting holder, leading to an increase in the number of parts.

It is an object of the present invention to provide a power transmission device for a tractor that can overcome such a problem with the conventional technique.

Solution to Problem

In a power transmission device for a tractor according to the present invention in which a forward/reverse drive switch mechanism is provided that converts power of a propeller shaft into forward or reverse drive power and transmits the forward or reverse drive power from the propeller shaft to an input shaft or from the propeller shaft through a reverse-drive power transmission shaft to the input shaft, a main speed change mechanism that switches between multiple speeds is provided between the input shaft to which the forward or reverse drive power is transmitted from the forward/reverse drive switch mechanism and a countershaft, and a sub-speed change mechanism that switches between a high and a low speed is provided between the countershaft and an output shaft that transmits rear-wheel drive power, driven gears on the countershaft of the main speed change mechanism are successively arranged from front to rear in descending order of speed, a sub-low-speed drive gear for the sub-speed change mechanism is provided in front of the highest-speed driven gear on the countershaft, and the next-highest-speed driven gear serves as a sub-high-speed drive gear for the sub-speed change mechanism, and a sub-low-speed driven gear and a sub-high-speed driven gear for the sub-speed change mechanism are provided on the output shaft and are engaged with the sub-low-speed drive gear and the next-highest-speed driven gear, respectively, and overlap the highest-speed driven gear, the sub-low-speed drive gear, and the next-highest-speed driven gear in a fore-and-aft direction.

According to the present invention, the arrangement of the driven gears on the countershaft of the main speed change mechanism is shortened in an axial direction, whereby the main speed change mechanism can be made compact in the axial direction.

Specifically, the sub-low-speed drive gear for the sub-speed change mechanism is provided in front of the highest-speed driven gear on the countershaft of the main speed change mechanism. The next-highest-speed driven gear of the main speed change mechanism serves as the sub-high-speed drive gear for the sub-speed change mechanism. The sub-low-speed driven gear and the sub-high-speed driven gear overlap the highest-speed driven gear, the sub-low-speed drive gear, and the next-highest-speed driven gear in the fore-and-aft direction. Therefore, the arrangement of the gears on the countershaft can be shortened in the axial direction, whereby the main speed change mechanism can be made compact in the axial direction.

In the above configuration, a front-wheel drive power extracting shaft that extracts power of the output shaft as front-wheel drive power via front-wheel drive power extracting means is preferably provided below the output shaft. The front-wheel drive power extracting means preferably includes a front-wheel drive power extracting gear provided on the output shaft in front of and adjacent to the sub-low-speed driven gear of the sub-speed change mechanism, and a power transmission gear that is supported by a rear end of the front-wheel drive power extracting shaft. The output shaft is preferably supported by a supporting wall of a mission case in front of the front-wheel drive power extracting gear.

With the above configuration, the front-wheel drive power extracting gear having a large diameter can be provided adjacent to the sub-low-speed driven gear having a large diameter, and the front-wheel drive power extracting gear supports the output shaft on both the front and rear sides thereof, i.e., the front-wheel drive power extracting gear can have a double-sided support structure.

In the above configuration, a first and a second supporting wall are preferably provided in a front mission case linked to a flywheel housing to form a first chamber that is in communication with an interior of the flywheel housing, a second or middle chamber, and a third or rear chamber. The forward/reverse drive switch mechanism is preferably provided in the second chamber. The main speed change mechanism, the sub-speed change mechanism, and the output shaft are preferably provided in the third chamber. The front-wheel drive power extracting shaft is preferably supported by the first and second supporting walls. The second supporting wall preferably includes an upper wall portion and a lower wall portion that are vertically separated from each other. The upper wall portion preferably rotatably supports the propeller shaft and the reverse-drive power transmission shaft of the forward/reverse drive switch mechanism, the input shaft of the main speed change mechanism, and the countershaft and the output shaft of the sub-speed change mechanism. The lower wall portion preferably supports the front-wheel drive power extracting shaft. The lower wall portion is preferably provided below the sub-low-speed driven gear. An opening that is open in an up-and-down direction and the fore-and-aft direction is preferably formed between the upper and lower wall portions. The front-wheel drive power extracting means is preferably provided in the opening.

With the above configuration, the front-wheel drive power extracting means can be provided in the opening that is open in the up-and-down direction and the fore-and-aft direction, whereby the front-wheel drive power extracting means can be optimally positioned.

In a power transmission device for a tractor according to the present invention in which a first and a second supporting wall are provided in a front mission case linked to a flywheel housing to form a first chamber that is in communication with an interior of the flywheel housing, a second or middle chamber, and a third or rear chamber, and the second and third chambers serve as an oil bath, a forward/reverse drive switch mechanism that converts power of a propeller shaft into forward or reverse drive power is provided in the second chamber, a main speed change mechanism that converts power transmitted from the forward/reverse drive switch mechanism to an input shaft into multiple speeds and transmits the power to a countershaft, a sub-speed change mechanism that receives from the countershaft the power converted by the main speed change mechanism and converts the power into a high and a low speed, and an output shaft that transmits rear-wheel drive power from the sub-speed change mechanism, are provided in a third chamber, and a front-wheel drive power extracting shaft that extracts power of the output shaft as front-wheel drive power via front-wheel drive power extracting means is supported by the first and second supporting walls, the second supporting wall includes an upper wall portion and a lower wall portion that are separated from each other in an up-and-down direction and a fore-and-aft direction, the upper wall portion rotatably supports the propeller shaft of the forward/reverse drive switch mechanism, the input shaft of the main speed change mechanism, and the countershaft and the output shaft of the sub-speed change mechanism, the lower wall portion is located apart from, behind and below the upper wall portion and supports the front-wheel drive power extracting shaft, an opening that is open in the up-and-down direction and the fore-and-aft direction is formed between the upper and lower wall portions, the front-wheel drive power extracting means is provided in the opening, and the front-wheel drive power extracting means has a front-wheel drive power extracting gear that is provided at a front end of the output shaft at the back of the upper wall portion, and a power transmission gear that is engaged with the front-wheel drive power extracting gear and is supported by a rear end of the front-wheel drive power extracting shaft.

According to the present invention, the flowability of oil in the fore-and-aft direction through the supporting wall that supports the speed change mechanism and the front-wheel drive power extracting shaft can be improved.

Specifically, the second supporting wall that supports the speed change mechanism and the front-wheel drive power extracting shaft includes the upper and lower wall portions that are separated from each other in the up-and-down direction. The opening that is open in the up-and-down direction and the fore-and-aft direction is formed between the upper and lower wall portions. The front-wheel drive power extracting means is provided in the opening. Therefore, the flowability of oil from the second chamber to the third chamber can be improved, and the front-wheel drive power extracting means can be optimally positioned.

In the above configuration, in the front-wheel drive power extracting means, the front-wheel drive power extracting gear preferably protrudes below the upper wall portion in the opening, and the power transmission gear preferably protrudes above the lower wall portion in the opening. The lower wall portion and a bottom portion of the front mission case preferably form, therebetween, an oil path that allows the second and third chambers to be in communication with each other.

With the above configuration, in the front-wheel drive power extracting means, the front-wheel drive power extracting gear provided at a front end of the output shaft at the back of the upper wall portion, and the power transmission gear provided at a rear end of the front-wheel drive power extracting shaft in front of the lower wall portion, can be engaged with each other in the opening, whereby the front-wheel drive power extracting means can be optimally positioned.

In the above configuration, a sub-low-speed driven gear of the sub-speed change mechanism that is provided at a front end of the output shaft, adjacent to the front-wheel drive power extracting gear, is preferably provided above the lower wall portion, and front-wheel drive clutch means that connects the power transmission gear to the front-wheel drive power extracting shaft is preferably provided below the upper wall portion.

With the above configuration, the second supporting wall that supports the speed change mechanism and the front-wheel drive power extracting shaft includes the upper and lower wall portions that are separated from each other in the up-and-down direction. The opening that is open in the up-and-down direction and the fore-and-aft direction is formed between the upper and lower wall portions. Therefore, the flowability of oil from the second chamber 21 to the third chamber 22 can be improved, whereby an increase in oil temperature can be reduced.

In a power transmission device for a tractor according to the present invention, a first speed change mechanism of a travel system that converts power of a propeller shaft, and a second speed change mechanism that converts power from the first speed change mechanism, are provided in a mission case, a PTO drive shaft is coaxially and directly connected to a rear portion of the propeller shaft, and a PTO power transmission shaft is provided at the back of the PTO drive shaft and is linked via a PTO clutch to the PTO drive shaft, a rear-axle supporting holder that supports a rear portion of the second speed change mechanism and through which the PTO drive shaft penetrates and is provided is removably mounted in the mission case, and pump drive power extracting means that transmits power of the PTO drive shaft to a hydraulic pump mounted to an outer surface of the mission case is provided between the rear-axle supporting holder and the PTO clutch, the pump drive power extracting means has a power transmission bevel gear mounted to the PTO drive shaft, and an extraction bevel pinion that is engaged with the power transmission bevel gear and is removably linked to a pump shaft of the hydraulic pump, and a gear holding portion that supports the power transmission bevel gear, and a pinion holding portion that protrudes backward and supports the extraction bevel pinion, are provided on a back surface of the rear-axle supporting holder.

According to the present invention, the accuracy of engagement of the bevel gear of the pump drive power extracting means can be easily improved and the number of parts can be reduced.

Specifically, in the pump drive power extracting means, the gear holding portion that supports the power transmission bevel gear, and the pinion holding portion that protrudes backward and supports the extraction bevel pinion, are provided on the back surface of the rear-axle supporting holder, whereby the accuracy of engagement of the power transmission bevel gear and the extraction bevel pinion can be easily improved, and the number of parts for supporting the extraction bevel pinion can be reduced.

In the above configuration, a first and a second supporting wall are preferably provided in a front mission case provided between a flywheel housing and a rear mission case to form a first chamber that is in communication with an interior of the flywheel housing, a second or middle chamber, and a third or rear chamber. A rear-axle supporting holder that forms a back wall of the third chamber is preferably removably mounted in the front mission case. A forward/reverse drive switch mechanism that converts power of the propeller shaft into forward or reverse drive power is preferably provided as the first speed change mechanism in the second chamber between the propeller shaft and a reverse-drive power transmission shaft. A main speed change mechanism that switches between multiple speeds, and a sub-speed change mechanism that switches between a high and a low speed and transmits rear-wheel drive power from a countershaft to an output shaft, are preferably provided as the second speed change mechanism in the third chamber between an input shaft to which the forward or reverse drive power is transmitted from the forward/reverse drive switch mechanism, and the countershaft.

With the above configuration, the mission case includes the front mission case MF and the rear mission case that are separated from each other. The forward/reverse drive switch mechanism is provided in the second chamber of the front mission case, and the main speed change mechanism and the sub-speed change mechanism are provided in the third chamber of the front mission case. The rear-axle supporting holder that forms a back wall of the third chamber is removably mounted in the front mission case. Therefore, the main speed change mechanism, the sub-speed change mechanism, the rear-axle supporting holder, the pump drive power extracting means, and the like can be considerably easily assembled.

In the above configuration, bearing portions of the input shaft, the countershaft, and the output shaft are preferably triangularly arranged and formed on a front surface of the rear-axle supporting holder. The gear holding portion is preferably formed on a back surface of the bearing portion of the countershaft.

With the above configuration, the bearing portions of the input shaft, the countershaft, and the output shaft are triangularly arranged and formed on the front surface of the rear-axle supporting holder, and the gear holding portion is formed on the back surface of the bearing portion of the countershaft. Therefore, the bearing portions on the front and rear sides of the rear-axle supporting holder can be easily and accurately centered.

In the above configuration, a rear end of the pinion holding portion of the rear-axle supporting holder and a rear end of a mounting portion of the hydraulic pump are preferably located further forward than a rear mission case joining surface at a rear end of the front mission case.

With the above configuration, the rear end of the pinion holding portion of the rear-axle supporting holder and the rear end of the mounting portion of the hydraulic pump are located further forward than the rear mission case joining surface at the rear end of the front mission case. Therefore, the pump drive power extracting means can be compactly accommodated in the front mission case.

DESCRIPTION OF EMBODIMENTS

Embodiments of the present invention will be described hereinafter with reference to the accompanying drawings.

Figure 1:
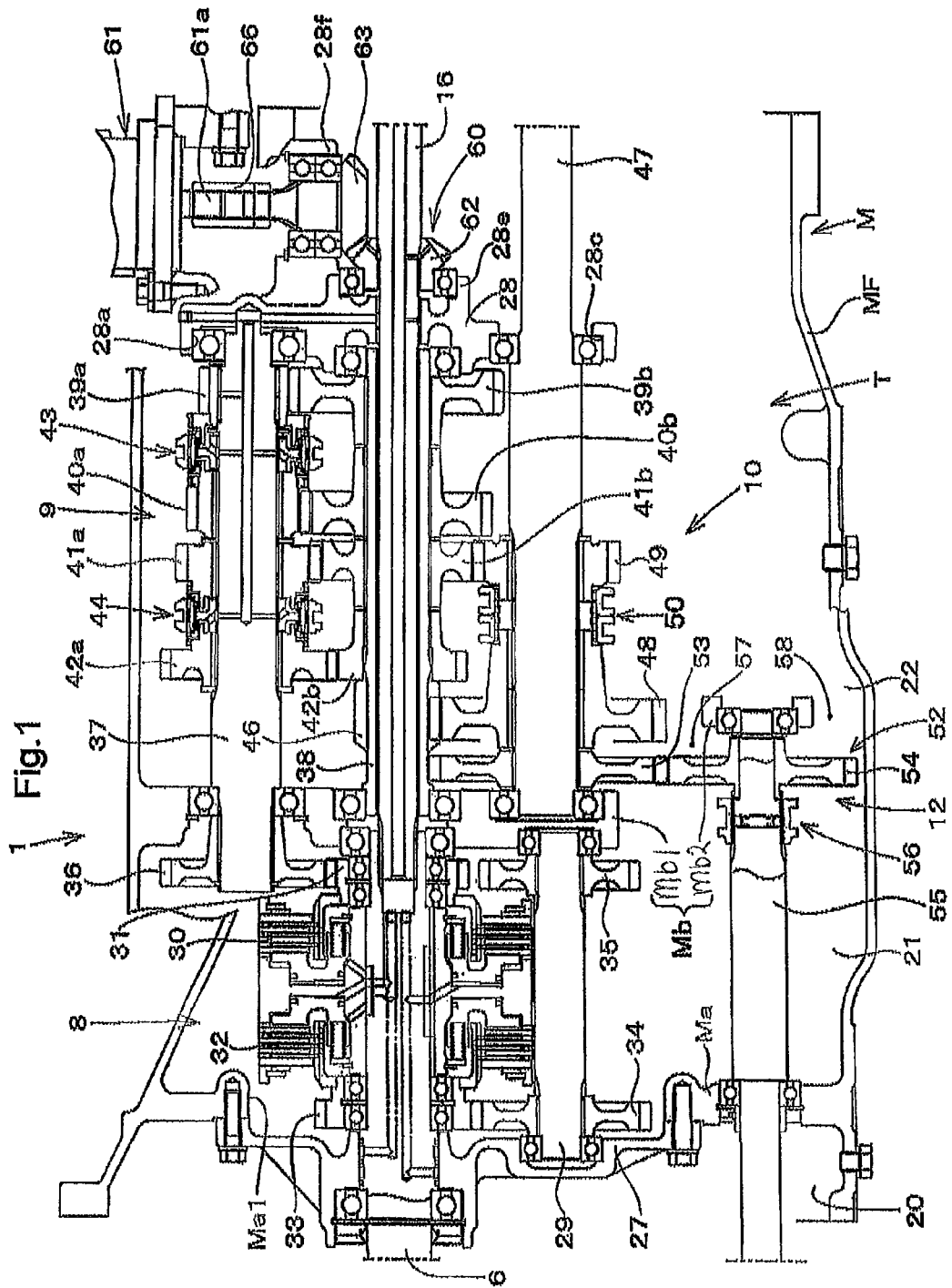
FIG. 1 is a cross-sectional view of an interior of a front mission case showing an embodiment of the present invention.
Figure 2:
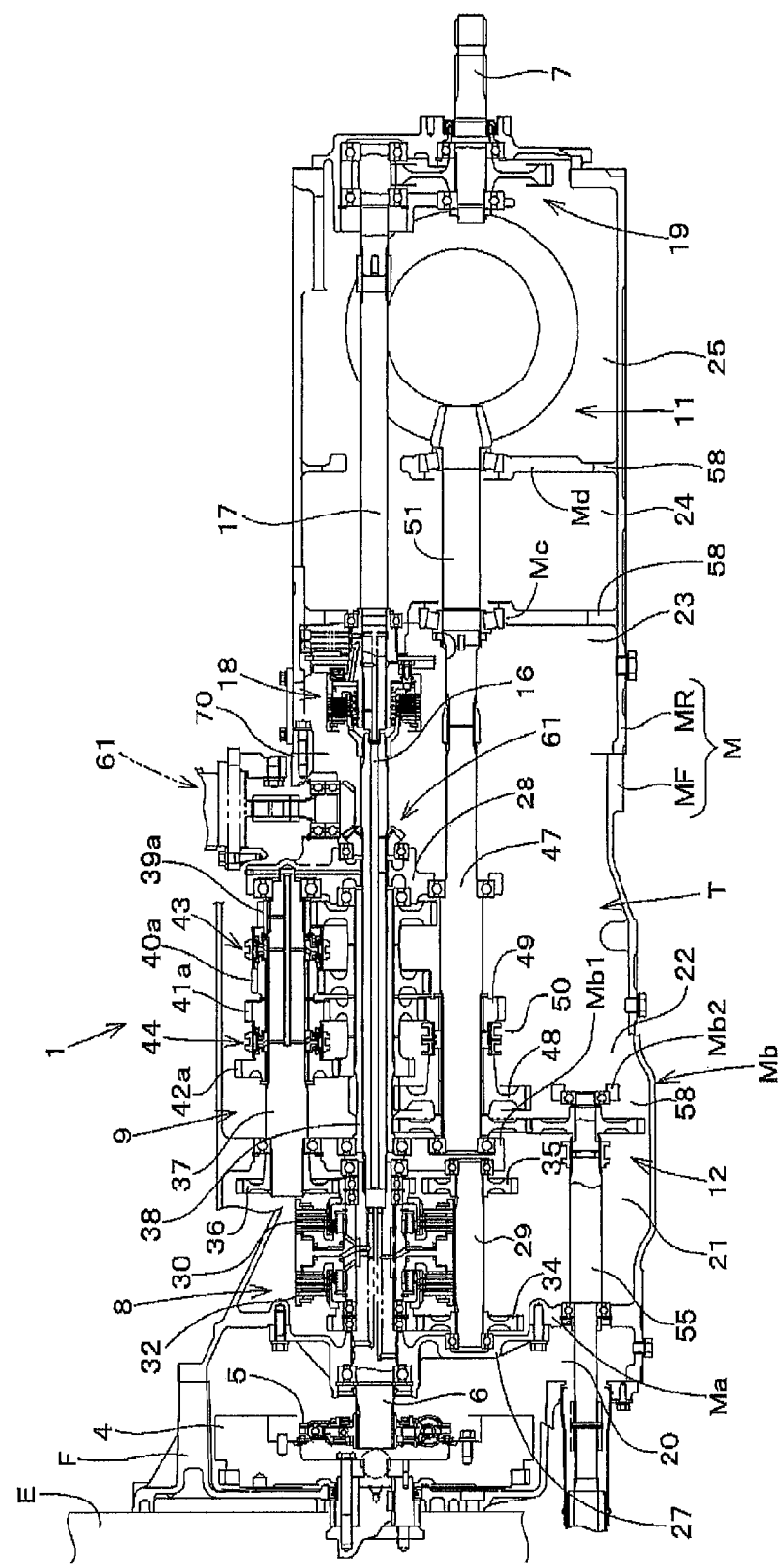
FIG. 2 is a cross-sectional view of an entire configuration of the embodiment of the present invention.
Figure 3:
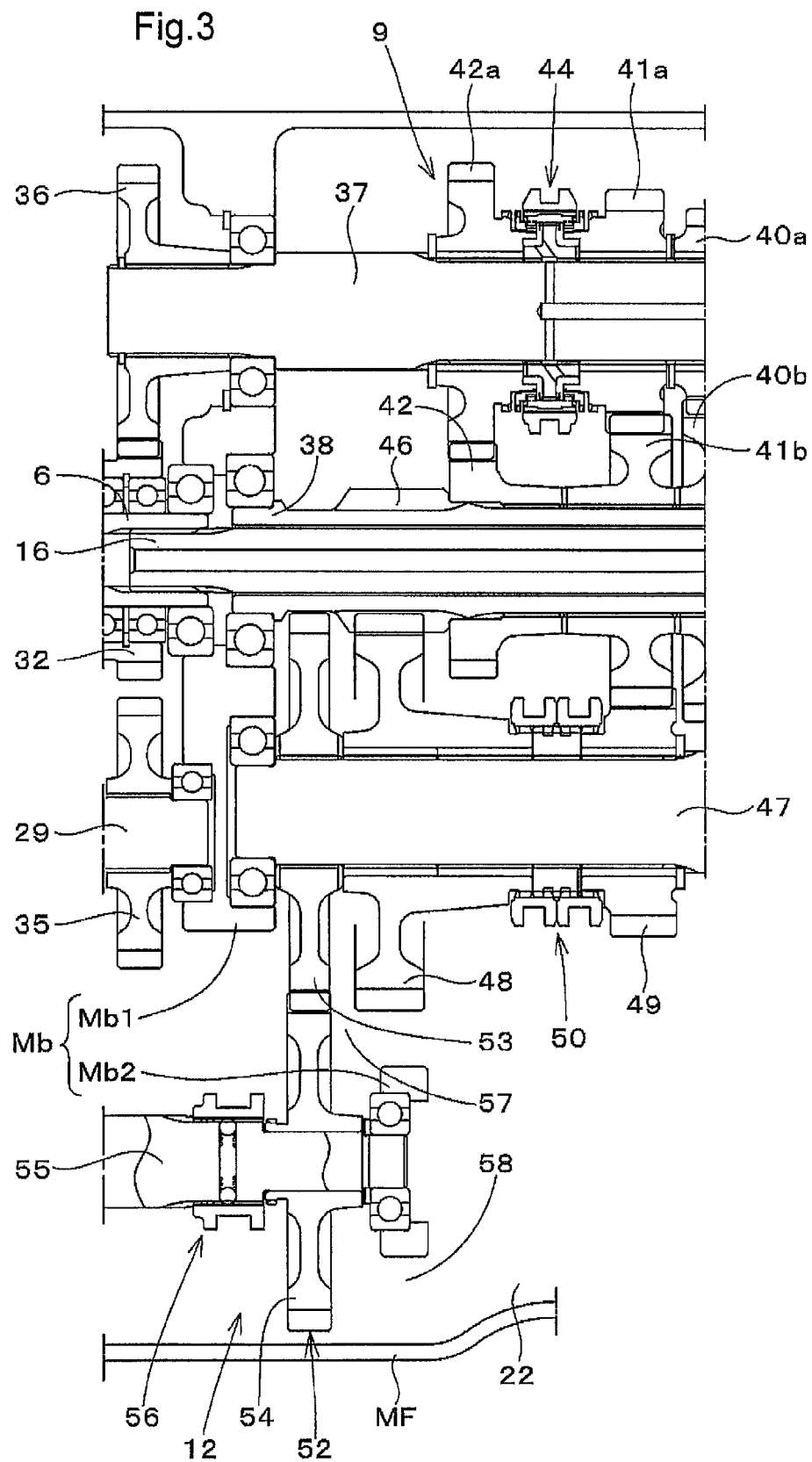
FIG. 3 is a cross-sectional view of a sub-speed change mechanism and a front-wheel drive power extracting mechanism.
Figure 4:
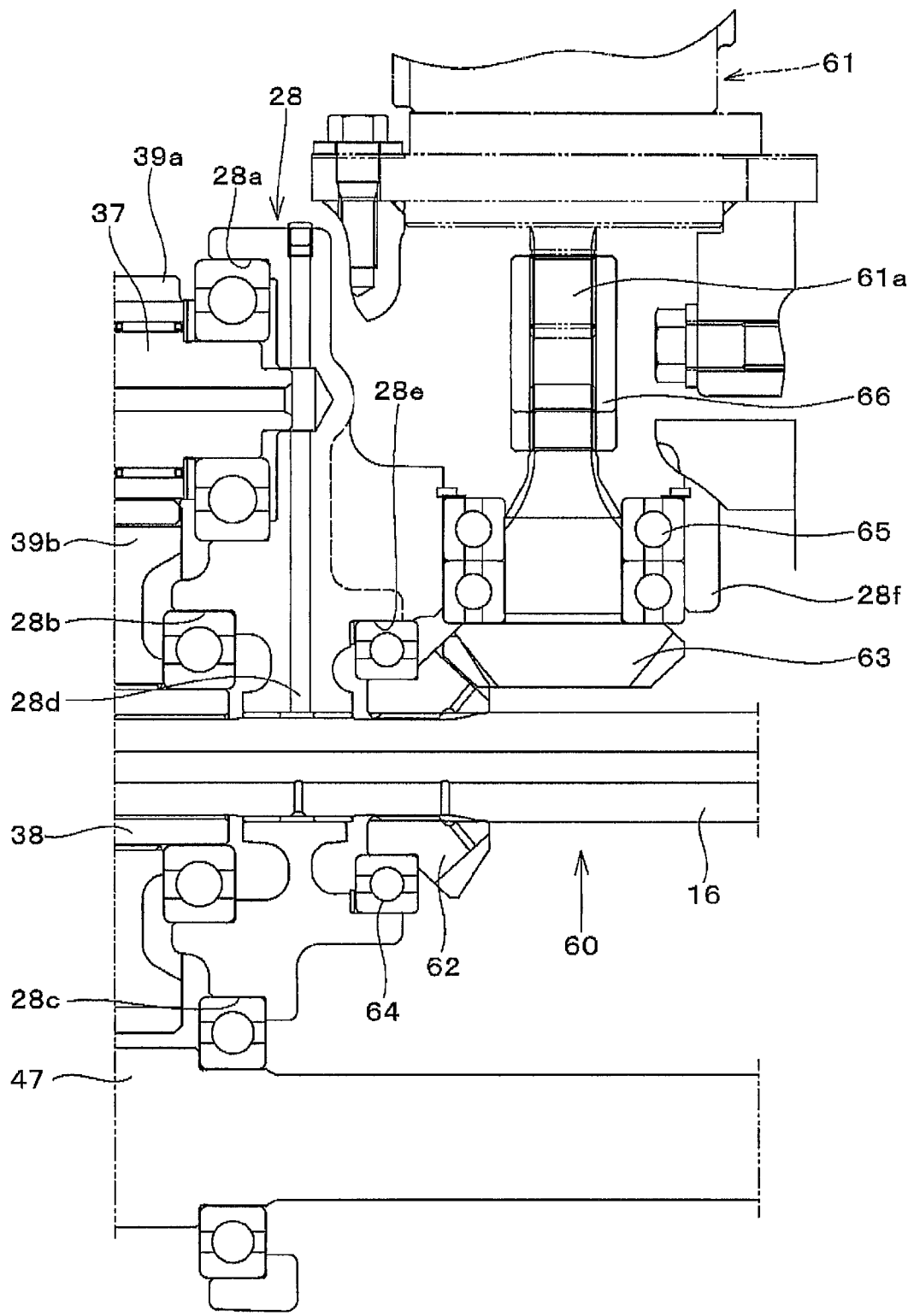
FIG. 4 is an enlarged cross-sectional view of pump drive power extracting means.

In FIGS. 1 and 2, the reference character 1 indicates a power transmission device for a four-wheel (front and rear wheels) drive tractor. A mission case M is linked to a rear end portion of a flywheel housing F linked to a rear end portion of an engine E. The mission case M has a front and a rear mission case MF and MR. A transmission T is accommodated in the front and rear mission cases MF and MR. The engine E, the flywheel housing F, the mission case M, and the like constitute the body of the tractor.

The transmission T has a travel drive system that transmits power from the engine E via a flywheel 4 and a buffering mechanism 5 to a propeller shaft 6, and transmits power from the propeller shaft 6 to the four wheels (i.e., front and rear drive wheels), and a PTO drive system that transmits power from the propeller shaft 6 to a PTO shaft 7.

The travel drive system of the transmission T includes a hydraulic switch type forward/reverse drive switch mechanism (shuttle device) 8 that converts the power of the propeller shaft 6 into a form in which the power is extracted in the forward direction and a form in which the power is extracted in the reverse direction, a manual switch type main speed change mechanism 9 that converts the power after the forward/reverse drive switching into four speeds, a manual switch type sub-speed change mechanism 10 that converts the power converted by the main speed change mechanism 9 into a high and a low speed, a rear-wheel differential mechanism 11 that transmits the power after the high/low switching to the rear wheels (drive wheels), and a front-wheel drive power extracting mechanism 12 of a front-wheel drive system that transmits the power after the high/low switching performed by the sub-speed change mechanism 10 to the front wheels (drive wheels).

The PTO drive system of the transmission T includes a PTO drive shaft 16 that is coaxially and directly linked to a rear portion of the propeller shaft 6, a PTO power transmission shaft 17 that is coaxially provided at the back of the PTO drive shaft 16, a PTO clutch 18 that transmits power from the PTO drive shaft 16 to the PTO power transmission shaft 17 (the PTO clutch 18 can connect and disconnect the two shafts), and a decelerating mechanism 19 that reduces the power from the PTO power transmission shaft 17 and transmits the reduced power to the PTO shaft 7.

The front mission case MF has a first supporting wall Ma and a second supporting wall Mb that are spaced from each other in the fore-and-aft direction. The first supporting wall Ma separates a first chamber 20 that is in communication with the flywheel housing F that accommodates the flywheel 4 and the buffering mechanism 5 from a second chamber 21 that accommodates the forward/reverse drive switch mechanism 8. The second supporting wall Mb separates a third chamber 22 that accommodates the main speed change mechanism 9 and the sub-speed change mechanism 10 from the second chamber 21.

The rear mission case MR has a third supporting wall Mc and a fourth supporting wall Md that are separated from each other in the fore-and-aft direction. The third supporting wall Mc separates a fourth chamber 23 that accommodates the PTO clutch 18 and is in communication with an interior of the third chamber 22 from a fifth chamber 24 that is provided at the back of the fourth chamber 23. The fourth supporting wall Md separates the fifth chamber 24 from a sixth chamber 25 that accommodates the rear-wheel differential mechanism 11.

A large opening Ma1 is formed at a middle of the first supporting wall Ma. A front-axle supporting holder 27 is mounted to the first supporting wall Ma using fixing means, such as a bolt or the like, covering the opening Ma1. A rear-axle supporting holder 28 is mounted between the third chamber 22 and the fourth chamber 23 using fixing means, such as a bolt or the like, separating the third chamber 22 and the fourth chamber 23 from each other in the fore-and-aft direction. The rear-axle supporting holder 28 is received and held by a protrusion formed on an inner circumferential surface of the front mission case MF and is fixed using a bolt.

The propeller shaft 6 is linked to the buffering mechanism 5 at a front end thereof, is supported by the front-axle supporting holder 27 at a front portion thereof, and is rotatably supported by the second supporting wall Mb at a rear portion thereof. A reverse-drive power transmission shaft 29 is provided in parallel to the propeller shaft 6. The reverse-drive power transmission shaft 29 is rotatably supported by the front-axle supporting holder 27 and the second supporting wall Mb at a front and a rear portion thereof, respectively, as with the propeller shaft 6. The hydraulic switch type forward/reverse drive switch mechanism 8 is provided between the propeller shaft 6 and the reverse-drive power transmission shaft 29.

The hydraulic switch type forward/reverse drive switch mechanism 8 includes a forward drive hydraulic clutch 30 provided on the propeller shaft 6, a forward drive output gear 31 that is supported on the propeller shaft 6 at the back of the forward drive hydraulic clutch 30 in a manner that allows the forward drive output gear 31 and the propeller shaft 6 to rotate relatively, a reverse drive hydraulic clutch 32, a reverse drive output gear 33 that is supported on the propeller shaft 6 in front of the reverse drive hydraulic clutch 32 in a manner that allows the reverse drive output gear 33 and the propeller shaft 6 to rotate relatively, a reverse drive first power transmission gear 34 that is provided at a front portion of the reverse-drive power transmission shaft 29 in a manner that allows the reverse drive first power transmission gear 34 and the reverse-drive power transmission shaft 29 to rotate together, and a reverse drive second power transmission gear 35 that is provided at a rear portion of the reverse-drive power transmission shaft 29 in a manner that allows the reverse drive second power transmission gear 35 and the reverse-drive power transmission shaft 29 to rotate together.

The forward drive output gear 31 and the reverse drive second power transmission gear 35 are both engaged with an input gear 36 that inputs power to the main speed change mechanism 9. The reverse drive first power transmission gear 34 is engaged with the reverse drive output gear 33.

The forward/reverse drive switch mechanism 8 actuates the forward drive hydraulic clutch 30 to transmit forward rotating power of the propeller shaft 6 to the input gear 36. The forward/reverse drive switch mechanism 8 actuates the reverse drive hydraulic clutch 32 to reverse and transmits the forward rotating power of the propeller shaft 6 to the input gear 36 via the reverse drive output gear 33, the reverse drive first power transmission gear 34, the reverse-drive power transmission shaft 29, and the reverse drive second power transmission gear 35.

The forward/reverse drive switch mechanism 8 can disengage both the forward drive hydraulic clutch 30 and the reverse drive hydraulic clutch 32 to disconnect power that is transmitted from the engine E to the travel drive system, i.e., serves as a travel system main hydraulic clutch.

In FIGS. 1 to 5, the manual switch type main speed change mechanism 9 is provided between an input shaft 37 that has the input gear 36 and receives power from the forward/reverse drive switch mechanism 8, and a countershaft 38 that is in parallel to the input shaft 37. The countershaft 38 is a cylindrical shaft that is fitted on an outer surface of the PTO drive shaft 16. The countershaft 38 and the input shaft 37 are each rotatably supported by the second supporting wall Mb at a front portion thereof and by the rear-axle supporting holder 28 at a rear portion thereof.

A front portion of the input shaft 37 protrudes forward from the second supporting wall Mb. The input gear 36 is mounted to the protruding front portion. A first-speed to fourth-speed (main speed change) drive gears 39a to 42a are successively arranged from the rear and freely fitted to the input shaft 37 between the second supporting wall Mb and the rear-axle supporting holder 28.

One of the first-speed drive gear 39a and the second-speed drive gear 40a is selected by first clutch means 43 to rotate together with the input shaft 37. One of the third-speed drive gear 41a and the fourth-speed drive gear 42a is selected by second clutch means 44 to rotate together with the input shaft 37.

A first-speed to fourth-speed driven gears 39b to 42b are provided on the countershaft 38 to rotate together. The driven gears 39b to 42b are engaged with the first-speed to fourth-speed drive gears 39a to 42a on the input shaft 37.

The first-speed to fourth-speed driven gears 39b to 42b on the countershaft 38 are successively arranged from front to rear in descending order of speed (the foremost driven gear is the highest-speed gear, and the rearmost driven gear is the lowest-speed gear). Therefore, the gear diameter gradually decreases as one progresses from rear to front. The foremost fourth-speed driven gear 42b has the smallest diameter.

The first clutch means 43 and the second clutch means 44 are of the synchromesh type. One of the first clutch means 43 and the second clutch means 44 is manually selected and operated using a single speed change lever (gear stick) to change the main speed change mechanism 9 from the neutral state to one of the first-speed to the fourth-speed.

A low-speed drive gear 46 for the sub-speed change mechanism 10 is formed at a front portion of the fourth-speed driven gear 42b (highest-speed driven gear) having the smallest diameter on the countershaft 38. The third-speed driven gear 41b (next-highest-speed driven gear) also serves as a high-speed drive gear for the sub-speed change mechanism 10.

The sub-speed change mechanism 10 is provided between the countershaft 38 and an output shaft 47 that is provided in parallel to the countershaft 38. A low-speed driven gear 48 that is engaged with the low-speed drive gear 46 and a high-speed driven gear 49 that is engaged with the third-speed driven gear 41b are freely fitted on the output shaft 47. One of the low-speed driven gear 48 and the high-speed driven gear 49 is selected and connected to the output shaft 47 by third clutch means 50 so that the selected gear and the output shaft 47 can rotate together.

The third-speed driven gear 41b and the fourth-speed driven gear 42b have a smaller diameter than those of the other driven gears 39b and 40b of the main speed change mechanism 9. Therefore, the low-speed driven gear 48 and the high-speed driven gear 49 are allowed to overlap the driven gears 41b and 42b in the axial direction.

Specifically, positions and lengths in the fore-and-aft direction of the low-speed driven gear 48 and the high-speed driven gear 49 are substantially the same as those of the low-speed drive gear 46, the third-speed driven gear 41b, and the fourth-speed driven gear 42b. The fourth-speed driven gear 42b has the smallest diameter. Therefore, even if the third clutch means 50 is provided on the output shaft 47, the fourth-speed driven gear 42b does not interfere with the third clutch means 50. Conversely, the fourth-speed driven gear 42b can be provided between the low-speed drive gear 46 and the third-speed driven gear 41b, corresponding to the third clutch means 50.

Because the low-speed drive gear 46 is provided in front of the fourth-speed driven gear 42b, the low-speed driven gear 48 having a large diameter can be provided without interfering with the driven gears 39b and 40b and without producing a useless space therearound.

The output shaft 47 is supported by the second supporting wall Mb and the rear-axle supporting holder 28, and is linked to a bevel pinion 51 at a rear end thereof to transmit rear-wheel drive power to the rear-wheel differential mechanism 11.

A front-wheel drive power extracting gear 53 is mounted to a front end of the output shaft 47 while being adjacent to the front side of the low-speed driven gear 48. The front-wheel drive power extracting gear 53 is engaged with a power transmission gear 54 provided therebelow to form a front-wheel drive power extracting means 52.

The front-wheel drive power extracting means 52 is provided between a front portion of the output shaft 47 and a rear portion of a front-wheel drive power extracting shaft 55. The power transmission gear 54 is freely fitted to the front-wheel drive power extracting shaft 55. Front-wheel drive clutch means 56 determines whether to allow the power transmission gear 54 to freely rotate or connect to the front-wheel drive power extracting shaft 55. When the power transmission gear 54 is connected to the front-wheel drive power extracting shaft 55, the power of the output shaft 47 is transmitted as front-wheel drive power to a front wheel differential mechanism via the front-wheel drive power extracting gear 53, the power transmission gear 54, and the front-wheel drive power extracting shaft 55.

A middle portion in the fore-and-aft direction of the front-wheel drive power extracting shaft 55 penetrates and is supported by the first supporting wall Ma. A rear end of the front-wheel drive power extracting shaft 55 that supports the power transmission gear 54 is supported by the second supporting wall Mb at the back of the power transmission gear 54. The front-wheel drive power extracting shaft 55 and the power transmission gear 54 are each rotatably supported.

Figure 5:
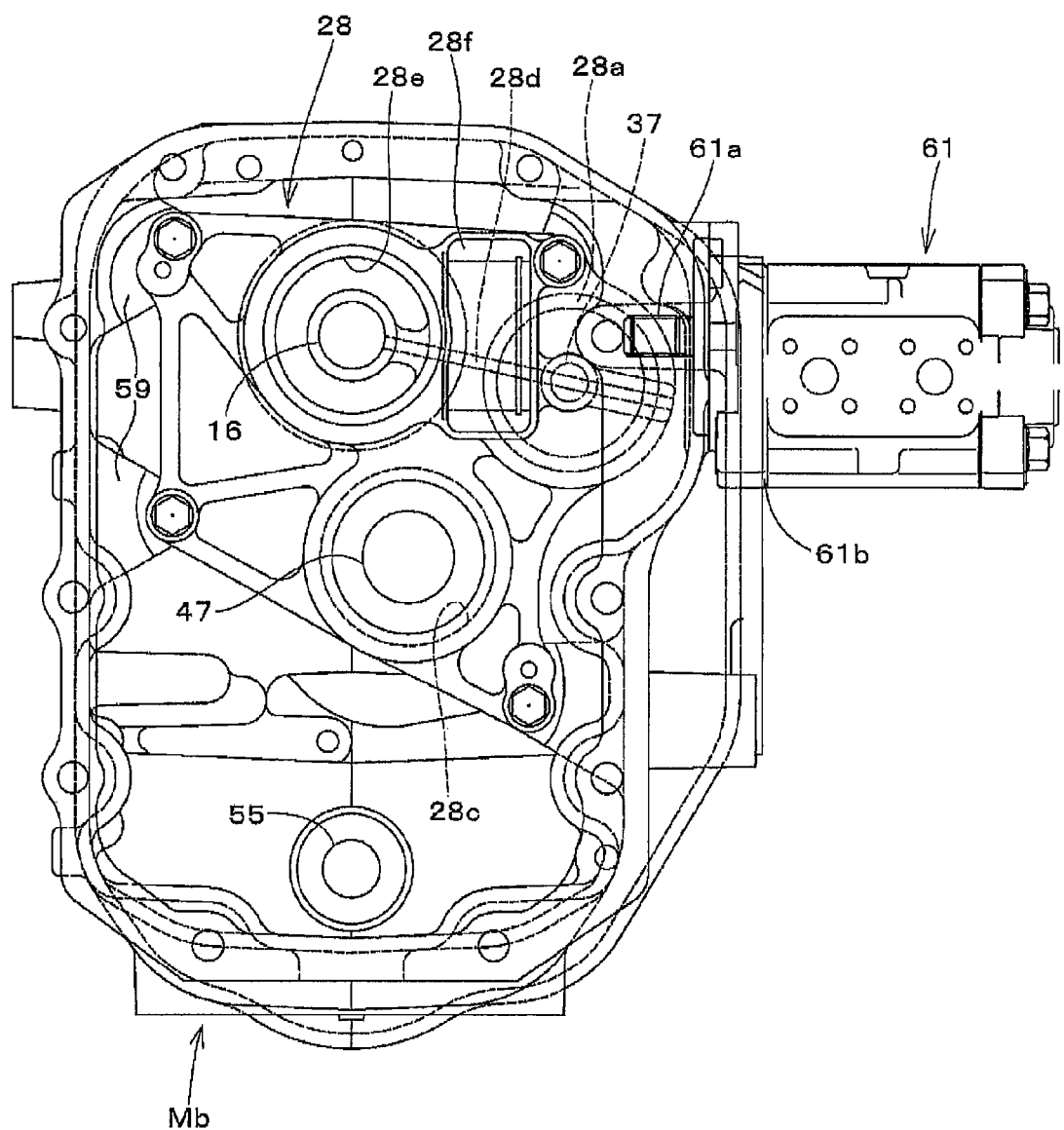
FIG. 5 is a back side view of the front mission case and a rear-axle supporting holder.

In FIGS. 1 and 5, the output shaft 47 is provided in parallel to the input shaft 37 and the countershaft 38, and the output shaft 47, the input shaft 37, and the countershaft 38 are triangularly arranged. The propeller shaft 6 and the PTO drive shaft 16 are arranged coaxial to the crank shaft of the engine E. The propeller shaft 6, the PTO drive shaft 16, and the front-wheel drive power extracting shaft 55 are located at a middle in a left-and-right direction of the mission case M. The output shaft 47 is located on one (right side) of the left and right sides of the mission case M, slightly away from the middle, and the input shaft 37 is located on one (right side) of the left and right sides of the mission case M, further away from the middle.

The second supporting wall Mb has an upper portion Mb1 and a lower portion Mb2 that are vertically separated from each other. The upper wall portion Mb1 supports rear ends of the propeller shaft 6 and the reverse-drive power transmission shaft 29 and front ends of the output shaft 47, the countershaft 38, and the input shaft 37. The lower wall portion Mb2 supports the front-wheel drive power extracting shaft 55.

The upper wall portion Mb1 and the lower wall portion Mb2 are separated from each other in the fore-and-aft direction so that the front-wheel drive power extracting gear 53 and the power transmission gear 54 are provided therebetween. Therefore, an opening 57 that is open in the up-and-down direction and the fore-and-aft direction is formed between the upper wall portion Mb1 and the lower wall portion Mb2.

The opening 57 has a larger area when the upper wall portion Mb1 and the lower wall portion Mb2 are separated from each other in the fore-and-aft direction than when the lower wall portion Mb2 is located directly below the upper wall portion Mb1.

In the mission case M, the second chamber 21 to the sixth chamber 25, except for the first chamber 20, serve as an oil bath to store oil for the transmission T and mission oil for the hydraulic actuator.

A path 58 is formed between each of the lower wall portion Mb2, the third supporting wall Mc, the fourth supporting wall Md, and the like, and a bottom portion of the mission case M, and serves as a flow path of mission oil from the second chamber 21 to the sixth chamber 25.

The upper wall portion Mb1 supports a front end of the output shaft 47 in front of the front-wheel drive power extracting gear 53. Therefore, a portion of the output shaft 47 where the low-speed driven gear 48, the high-speed driven gear 49, and the front-wheel drive power extracting gear 53 are provided are supported by the upper wall portion Mb1 and the rear-axle supporting holder 28 at both ends thereof, i.e., a front and a rear portion thereof.

The lower wall portion Mb2 is located below the low-speed driven gear 48 (directly below it in the fore-and-aft direction), and allows the low-speed driven gear 48 having a large diameter to be provided, and also allows the low-speed driven gear 48 and the front-wheel drive power extracting gear 53 to be adjacent to each other and in intimate contact with each other.

Moreover, the front-wheel drive power extracting gear 53 is allowed to be provided at a front end of the output shaft 47, and therefore, the power transmission gear 54 can be provided in the front mission case MF as far forward as possible. Therefore, a length in the fore-and-aft direction over which the front-wheel drive power extracting shaft 55 overlaps the output shaft 47 is reduced, whereby the front-wheel drive power extracting shaft 55 can be shortened and therefore can be formed at lower cost.

In FIGS. 1 and 5, the front mission case MF has a large opening at a rear end thereof. A plurality of (four) protrusions 59 are provided on an inner circumferential surface in the vicinity of a rear portion of the front mission case MF. An outer circumferential portion of the rear-axle supporting holder 28 is received and held by the protrusions 59, and is mounted using fastening means, such as a bolt or the like.

In FIGS. 1, 2, 4, and 5, a bearing recessed portion 28a that supports the input shaft 37 via a bearing, a bearing recessed portion 28b that supports the countershaft 38 via a bearing, and a bearing recessed portion 28c that supports the output shaft 47 via a bearing, are formed on a front surface of the rear-axle supporting holder 28. Pump drive power extracting means 60 is provided on a back surface of the rear-axle supporting holder 28. A lubricating oil path 28d is formed in the rear-axle supporting holder 28.

A hydraulic pump 61 that supplies hydraulic fluid to a hydraulic apparatus of the tractor is mounted to an outer surface of a side wall in the vicinity of a rear end of the front mission case MF. Power is extracted from the PTO drive shaft 16 via the pump drive power extracting means 60.

The pump drive power extracting means 60 has a power transmission bevel gear 62 that is fitted and mounted to the PTO drive shaft 16, and an extraction bevel pinion 63 that is engaged with the power transmission bevel gear 62. The pinion holding portion 28b and a pump shaft 61a of the hydraulic pump 61 are removably linked to each other via a coupling 66. The extraction bevel pinion 63 has a shaft portion and a bevel gear that are integrally molded. The shaft portion and the bevel gear may be separately formed and then firmly joined together.

A gear holding portion 28e that supports the power transmission bevel gear 62 via a bearing 64, and a pinion holding portion 28f that protrudes backward and supports the extraction bevel pinion 63 via a bearing 65, are formed on a back surface of the rear-axle supporting holder 28. The axis lines of the gear holding portion 28e and the pinion holding portion 28f are perpendicular to each other.

Therefore, the rear-axle supporting holder 28 is worked from the front surface to produce the bearing recessed portions 28a, 28b, and 28c, from the back surface to produce the gear holding portion 28e, and from the outer side to produce the lubricating oil path 28d and the pinion holding portion 28f. Thus, these portions are produced to work the single object, and therefore, centering can be accurately performed. Also, the engagement of the power transmission bevel gear 62 and the extraction bevel pinion 63 can be easily and accurately adjusted.

A rear end of the pinion holding portion 28b of the rear-axle supporting holder 28 and a rear end of a mounting portion 61b of the hydraulic pump 61 are located further forward than a rear mission case MR joining surface 70 at the rear end of the front mission case MF. As a result, when the front and rear mission cases MF and MR are joined together after structural components are mounted thereto, a fewer number of structural components protrude from the joining surface 70, whereby it is easier to assemble the mission case M.

The rear-axle supporting holder 28 is inserted from the rear end of the front mission case MF to be mounted to the protrusions 59 on the inner surface of the front mission case MF. After the power transmission bevel gear 62 and the extraction bevel pinion 63 are mounted to the front mission case MF, the hydraulic pump 61 can be mounted to the front mission case MF from the outside.

Note that, in the present invention, the shapes and positional relationships in the fore-and-aft, left-and-right, and up-and-down directions of the members in the above embodiment shown in FIGS. 1 to 5 are most preferable. However, the present invention is not limited to the above embodiment, and various changes and modifications can be made to the members, configurations, and combinations.

For example, although the hydraulic switch type forward/reverse drive switch mechanism 8 is used as a speed change mechanism in the second chamber 21, a manual switch type may be used. Although the main speed change mechanism 9 and the sub-speed change mechanism 10 in the third chamber 22 are of the manual switch type, these mechanisms may be of the hydraulic switch type.

Also, as a speed change mechanism, a high/low-speed change mechanism that converts drive power into a high and a low speed or an ultra-decelerating mechanism that decelerates to a larger extent than that of the sub-speed change mechanism 10, may be added.

For example, although the speed change mechanisms of the travel system are the hydraulic switch type forward/reverse drive switch mechanism 8, the main speed change mechanism 9, and the sub-speed change mechanism 10, the forward/reverse drive switch mechanism 8 may be of the manual switch type. Alternatively, a hydraulic switch type or manual switch type high/low switch mechanism that switches the power of the propeller shaft 6 between high and low may be used instead of the forward/reverse drive switch mechanism 8.

The main speed change mechanism 9 and the sub-speed change mechanism 10 may be of the hydraulic switch type. The sub-speed change mechanism 10 may be removed. Conversely, an ultra-decelerating mechanism that further decelerates may be added to the main speed change mechanism 9 and the sub-speed change mechanism 10.

The second chamber 21 may be elongated in the fore-and-aft direction so that a plurality of travel-system speed change mechanisms (the forward/reverse drive switch mechanism 8, the main speed change mechanism 9, the sub-speed change mechanism 10, and the like) are provided in the second chamber 21. The front-wheel drive power extracting shaft 55 may be supported at a rear end thereof by the second supporting wall Mb that separates the rear portion of the second chamber 21. The front-wheel drive power extracting shaft 55 may be located below the travel-system speed change mechanisms, extending substantially across the travel-system speed change mechanisms in the fore-and-aft direction.

For example, although the first speed change mechanism is the hydraulic switch type forward/reverse drive switch mechanism 8, the first speed change mechanism may be a hydraulic switch type high/low switch mechanism that switches the power of the propeller shaft 6 between high and low, or a manual switch type speed change mechanism.

Although the second speed change mechanism includes the main speed change mechanism 9 and the sub-speed change mechanism 10, the second speed change mechanism may include only the main speed change mechanism 9. An ultra-decelerating mechanism that further decelerates may be added to the main speed change mechanism 9 and the sub-speed change mechanism 10.

The mission case M may be an integral unit of the front mission case MF and the rear mission case MR without a joint surface.

List Of Reference Numerals
   1 power extracting device
   6 propeller shaft
   8 forward/reverse drive switch mechanism
   9 main speed change mechanism
   10 sub-speed change mechanism
   12 front-wheel drive power extracting mechanism
   16 drive shaft
   20 first chamber
   21 second chamber
   22 third chamber
   27 front-axle supporting holder
   28 rear-axle supporting holder
   29 reverse-drive power transmission shaft
   36 input gear
   37 input shaft
   38 countershaft
   39a drive gear
   39b driven gear
   41b next-highest-speed driven gear (sub-high-speed drive gear)
   42b highest-speed driven gear
   46 sub-low-speed drive gear
   47 output shaft
   48 sub-low-speed driven gear
   49 sub-high-speed driven gear
   52 front-wheel drive power extracting means
   53 front-wheel drive power extracting gear
   54 power transmission gear
   55 front-wheel drive power extracting shaft
   56 front-wheel drive clutch means
   57 opening
   F flywheel housing
   M mission case
   MF front mission case
   MR rear mission case
   Ma first supporting wall Mb second supporting wall
Mb1 upper wall portion
Mb2 lower wall portion
T transmission

The invention claimed is:

1. A power transmission device for a tractor in which
a forward/reverse drive switch mechanism is provided that converts power of a propeller shaft into forward or reverse drive power and transmits the forward or reverse drive power from the propeller shaft to an input shaft or from the propeller shaft through a reverse-drive power transmission shaft to the input shaft, a main speed change mechanism that switches between multiple speeds is provided between the input shaft to which the forward or reverse drive power is transmitted from the forward/reverse drive switch mechanism and a countershaft, and a sub-speed change mechanism that switches between a high and a low speed is provided between the countershaft and an output shaft that transmits rear-wheel drive power,
wherein
driven gears on the countershaft of the main speed change mechanism are successively arranged from front to rear in descending order of speed, a sub-low-speed drive gear for the sub-speed change mechanism is provided in front of the highest-speed driven gear on the countershaft, and the next-highest-speed driven gear serves as a sub-high-speed drive gear for the sub-speed change mechanism, and
a sub-low-speed driven gear and a sub-high-speed driven gear for the sub-speed change mechanism are provided on the output shaft and are engaged with the sub-low-speed drive gear and the next-highest-speed driven gear, respectively, and overlap the highest-speed driven gear, the sub-low-speed drive gear, and the next-highest-speed driven gear in a fore-and-aft direction.

2. The power transmission device according to claim 1, wherein
a front-wheel drive power extracting shaft that extracts power of the output shaft as front-wheel drive power via front-wheel drive power extracting means is provided below the output shaft, and
the front-wheel drive power extracting means includes a front-wheel drive power extracting gear provided on the output shaft in front of and adjacent to the sub-low-speed driven gear of the sub-speed change mechanism, and a power transmission gear that is supported by a rear end of the front-wheel drive power extracting shaft, and the output shaft is supported by a supporting wall of a mission case in front of the front-wheel drive power extracting gear.

3. The power transmission device according to claim 2, wherein
a first and a second supporting wall are provided in a front mission case linked to a flywheel housing to form a first chamber that is in communication with an interior of the flywheel housing, a second or middle chamber, and a third or rear chamber,
the forward/reverse drive switch mechanism is provided in the second chamber, the main speed change mechanism, the sub-speed change mechanism, and the output shaft are provided in the third chamber, and the front-wheel drive power extracting shaft is supported by the first and second supporting walls, and
the second supporting wall includes an upper wall portion and a lower wall portion that are vertically separated from each other, the upper wall portion rotatably supports the propeller shaft and the reverse-drive power transmission shaft of the forward/reverse drive switch mechanism, the input shaft of the main speed change mechanism, and the countershaft and the output shaft of the sub-speed change mechanism, the lower wall portion supports the front-wheel drive power extracting shaft, the lower wall portion is provided below the sub-low-speed driven gear, an opening that is open in an up-and-down direction and the fore-and-aft direction is formed between the upper and lower wall portions, and the front-wheel drive power extracting means is provided in the opening.

4. A power transmission device for a tractor in which
a first and a second supporting wall are provided in a front mission case linked to a flywheel housing to form a first chamber that is in communication with an interior of the flywheel housing, a second or middle chamber, and a third or rear chamber, and the second and third chambers serve as an oil bath, and
a forward/reverse drive switch mechanism that converts power of a propeller shaft into forward or reverse drive power is provided in the second chamber, a main speed change mechanism that converts power transmitted from the forward/reverse drive switch mechanism to an input shaft into multiple speeds and transmits the power to a countershaft, a sub-speed change mechanism that receives from the countershaft the power converted by the main speed change mechanism and converts the power into a high and a low speed, and an output shaft that transmits rear-wheel drive power from the sub-speed change mechanism, are provided in a third chamber, and a front-wheel drive power extracting shaft that extracts power of the output shaft as front-wheel drive power via front-wheel drive power extracting means is supported by the first and second supporting walls,
wherein
the second supporting wall includes an upper wall portion and a lower wall portion that are separated from each other in an up-and-down direction and a fore-and-aft direction, the upper wall portion rotatably supports the propeller shaft of the forward/reverse drive switch mechanism, the input shaft of the main speed change mechanism, and the countershaft and the output shaft of the sub-speed change mechanism, the lower wall portion is located apart from, behind and below the upper wall portion and supports the front-wheel drive power extracting shaft, an opening that is open in the up-and-down direction and the fore-and-aft direction is formed between the upper and lower wall portions, and the front-wheel drive power extracting means is provided in the opening, and
the front-wheel drive power extracting means has a front-wheel drive power extracting gear that is provided at a front end of the output shaft at the back of the upper wall portion, and a power transmission gear that is engaged with the front-wheel drive power extracting gear and is supported by a rear end of the front-wheel drive power extracting shaft.

5. The power transmission device according to claim 4, wherein
in the front-wheel drive power extracting means, the front-wheel drive power extracting gear protrudes below the upper wall portion in the opening, and the power transmission gear protrudes above the lower wall portion in the opening, and the lower wall portion and a bottom portion of the front mission case form, therebetween, an oil path that allows the second and third chambers to be in communication with each other.

6. The power transmission device according to claim 5, wherein
a sub-low-speed driven gear of the sub-speed change mechanism that is provided at a front end of the output shaft, adjacent to the front-wheel drive power extracting gear, is provided above the lower wall portion, and front-wheel drive clutch means that connects the power transmission gear to the front-wheel drive power extracting shaft is provided below the upper wall portion.

7. The power transmission device according to claim 4, wherein
a sub-low-speed driven gear of the sub-speed change mechanism that is provided at a front end of the output shaft, adjacent to the front-wheel drive power extracting gear, is provided above the lower wall portion, and front-wheel drive clutch means that connects the power transmission gear to the front-wheel drive power extracting shaft is provided below the upper wall portion.

8. A power transmission device for a tractor, wherein
a first speed change mechanism of a travel system that converts power of a propeller shaft, and a second speed change mechanism that converts power from the first speed change mechanism, are provided in a mission case, a PTO drive shaft is coaxially and directly connected to a rear portion of the propeller shaft, and a PTO power transmission shaft is provided at the back of the PTO drive shaft and is linked via a PTO clutch to the PTO drive shaft,
a rear-axle supporting holder that supports a rear portion of the second speed change mechanism and through which the PTO drive shaft penetrates and is provided is removably mounted in the mission case, and pump drive power extracting means that transmits power of the PTO drive shaft to a hydraulic pump mounted to an outer surface of the mission case is provided between the rear-axle supporting holder and the PTO clutch,
the pump drive power extracting means has a power transmission bevel gear mounted to the PTO drive shaft, and an extraction bevel pinion that is engaged with the power transmission bevel gear and is removably linked to a pump shaft of the hydraulic pump, and
a gear holding portion that supports the power transmission bevel gear, and a pinion holding portion that protrudes backward and supports the extraction bevel pinion, are provided on a back surface of the rear-axle supporting holder, the pinion holding portion being formed integrally with the rear-axle supporting holder.

9. The power transmission device according to claim 8, wherein
a first and a second supporting wall are provided in a front mission case provided between a flywheel housing and a rear mission case to form a first chamber that is in communication with an interior of the flywheel housing, a second or middle chamber, and a third or rear chamber, and a rear-axle supporting holder that forms a back wall of the third chamber is removably mounted in the front mission case,
a forward/reverse drive switch mechanism that converts power of the propeller shaft into forward or reverse drive power is provided as the first speed change mechanism in the second chamber between the propeller shaft and a reverse-drive power transmission shaft, and a main speed change mechanism that switches between multiple speeds, and a sub-speed change mechanism that switches between a high and a low speed and transmits rear-wheel drive power from a countershaft to an output shaft, are provided as the second speed change mechanism in the third chamber between an input shaft to which the forward or reverse drive power is transmitted from the forward/reverse drive switch mechanism, and the countershaft.

10. The power transmission device according to claim 9, wherein
bearing portions of the input shaft, the countershaft, and the output shaft are triangularly arranged and formed on a front surface of the rear-axle supporting holder, and the gear holding portion is formed on a back surface of the bearing portion of the countershaft.

11. The power transmission device according to claim 10, wherein
a rear end of the pinion holding portion of the rear-axle supporting holder and a rear end of a mounting portion of the hydraulic pump are located further forward than a rear mission case joining surface at a rear end of the front mission case.

12. The power transmission device according to claim 9, wherein
a rear end of the pinion holding portion of the rear-axle supporting holder and a rear end of a mounting portion of the hydraulic pump are located further forward than a rear mission case joining surface at a rear end of the front mission case.

* * * * *